July 7, 1964 J. E. LISINSKI 3,139,763

INCREMENTAL DRIVE MECHANISM

Filed June 7, 1961 2 Sheets-Sheet 1

INVENTOR.
JOSEPH E. LISINSKI

BY Robert B. Crouch

ATTORNEY

United States Patent Office
3,139,763
Patented July 7, 1964

3,139,763

INCREMENTAL DRIVE MECHANISM

Joseph E. Lisinski, San Jose, Calif., assignor to International Business Machines Corporation, New York, N.Y., a corporation of New York Filed June 7, 1961, Ser. No. 115,441
11 Claims. (Cl. 74—125)

The present invention relates to an incremental drive mechanism and more particularly to a high speed drive mechanism for feeding record tape in either a forward or reverse direction.

Present day punches and readers of record tape generally operate at high speed, i.e. 150 c.p.s. or higher, so that it is necessary that they incorporate a reliable tape feed escapement mechanism which is capable of sustained operation at the required speed. While prior art escapement mechanisms have been suggested which are capable of continued high speed operation, the effective life of these mechanisms has been limited and provisions made for record tape reversal have been very expensive, in time consumed for operation, space required, or manufacturing cost. Many of the prior art escapement mechanisms provide no reverse drive mechanism for deleting records or characters that are in error. To achieve a record tape reversal in these devices, the drive motor must be stopped, then reversed to drive the escapement in the reverse direction, and then reversed again to once more drive the tape in a forward direction. Even in those escapement mechanisms which have provided reverse drives, the reverse feature has been bulky and complex, since these mechanisms have generally employed duplicate drive mechanisms in parallel, one for forward drive and the other for reverse drive.

The object of the present invention is the provision of a relatively inexpensive, compact incremental drive mechanism capable of high speed reversal.

The shortcomings of the prior art record tape escapement mechanisms are avoided in the present invention by provision of a single compact drive mechanism which is capable of forward, idle or reverse drive at full speed operation. This is achieved by provision of a detent wheel assembly, which is drivingly connected to a tape feed sprocket, and a pair of cam followers which are mounted in line with the detent wheel. The cam followers are oscillated in opposite directions by a pair of escape cams which are driven by a continuously rotating drive shaft. Interposer drive rods are carried by the cam followers and are selectively positioned in notches of the detent wheel by spring loaded bell cranks. Movements of the bell cranks are controlled by interposer cams acting through sliding interposers which are located between the bell cranks and the interposer cams. A solenoid is provided for reversing the position of the sliding interposers, so that each bell crank then operates from the opposite interposer cam, thereby reversing the sprocket wheel direction of rotation.

The foregoing and other objects, features and advantages of the invention will be apparent from the following more particular description of preferred embodiments of the invention, as illustrated in the accompanying drawings.

Figure 1:
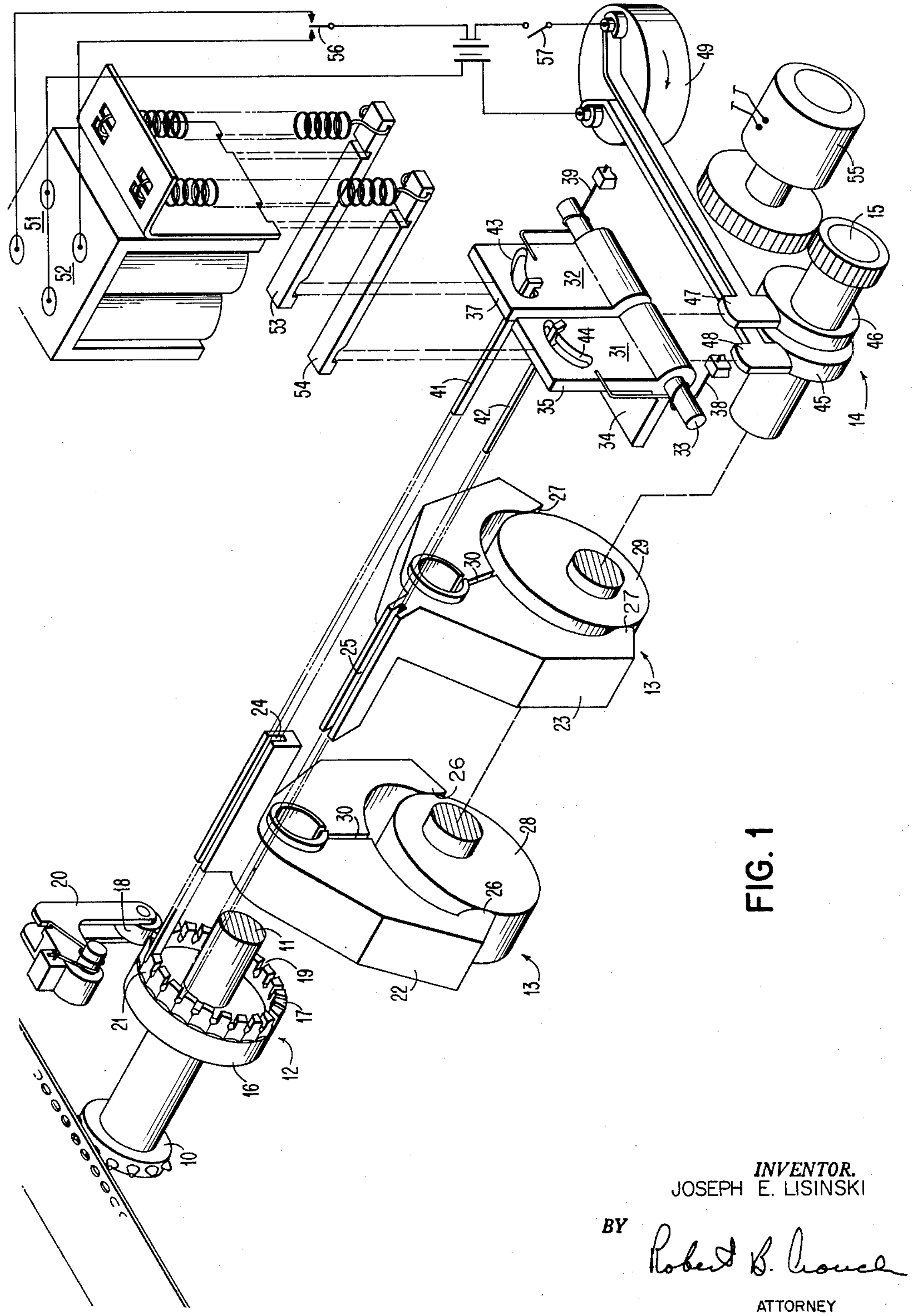
Figure 2:
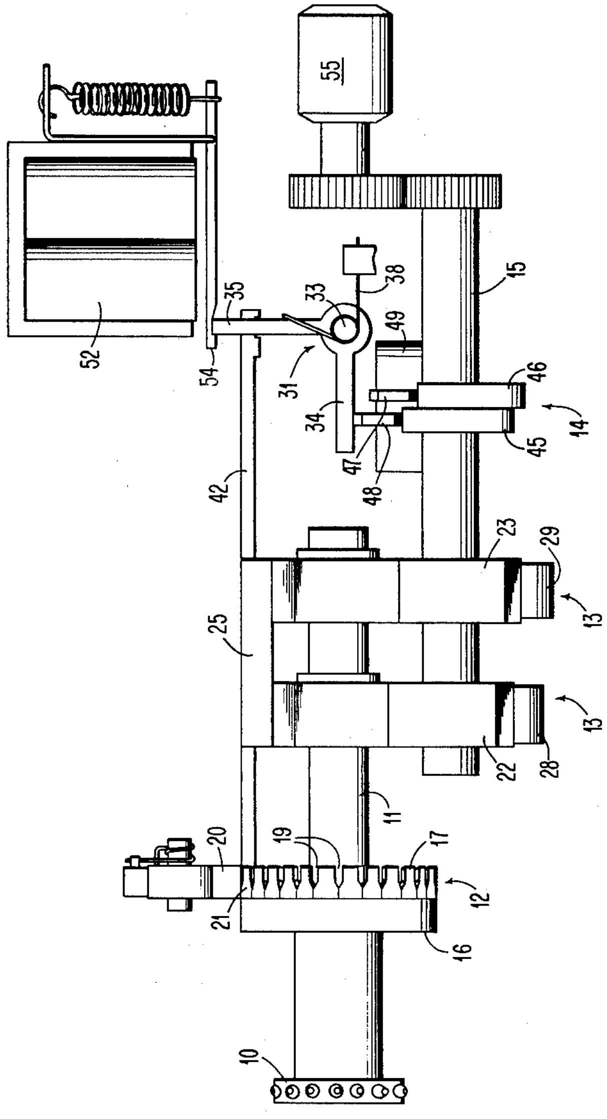

FIG. 1 is an exploded view showing the elements of the present invention in perspective, and FIG. 2 is an elevation view of the present invention.

Referring more particularly to FIG. 1 of the drawing, the incremental drive mechanism of the present invention is illustrated as including a tape feed sprocket wheel 10 mounted on an output drive shaft 11 along with a detent wheel assembly 12. A motion generating means 13 and a drive control assembly 14 are mounted in line with the detent wheel assembly and are drivingly coupled to an input drive shaft 15.

The detent wheel assembly 12 includes a detent wheel 16, a face gear 17 and a detent roller 18. The face gear is formed on the surface of the detent wheel removed from the sprocket and is provided with equally spaced slots or notches 19. The detent roller 18 is mounted on a spring loaded pawl 20 and rides in a series of convolutions 21. The convolutions 21 are equally spaced in a row about the circumference of the detent wheel, the center line of each convolution being aligned with a slot 19. The motion generator 13 includes a pair of yoke shaped cam followers 22 and 23 pivotally mounted on the output drive shaft 11. Each cam follower includes an elongated grooved guide 24 and 25 which is aligned with the face gear 17. Each cam follower is also provided with a yoke extending away from the guide, each yoke terminating in a pair of inwardly extending fingers 26 and 27 which serve as the cam follower surfaces. A pair of escape cams 28 and 29 are secured to the input drive shaft 15, each cam being aligned with, and embraced by, one of the followers 22 and 23. The base of each yoke is slotted as at 30 to permit spring loading of the fingers 26 and 27 against the circumference of the associated escape cam. Cams 28 and 29 are identical in profile, but are out of phase with each other by 180°. The curve of each cam is such that a dwell, rise, dwell, fall, motion is imparted to the cam followers 22 and 23.

The drive control assembly 14 includes a pair of bell cranks 31 and 32 pivotally mounted on a rod 33. The bell cranks include aligned angularly directed arms 34, 35 and 36, 37 and are biased toward the detent wheel assembly by means of springs 38 and 39. A pair of interposer drive rods 41 and 42 are secured to the bell crank arms 35 and 37. One end of each interposer drive rod is received within an arcuate slot 43 or 44 in its associated bell crank arm to allow transverse movement of the rod relative to the bell crank. The rods are retained in the slots by any suitable means, such as an edge of the slot being received in a notch in the rod. The opposite end of each drive rod is slidably received within the groove in a cam follower guide 24 or 25. A pair of interposer cams 45 and 46 are secured to the input drive shaft in line with arms 34 and 36 of the bell cranks. Interposer cams 45 and 46 are identical in profile, but are 180° out of phase. The curve of each cam is such as to impart a rise, dwell, fall type of motion to the interposer. A pair of sliding interposers 47 and 48 are fixed at one end to a reverse solenoid 49 and each interposer cooperates with one of the interposer cams, the distal ends of the interposers being located between the cams and the arms 34 and 36 of the bell cranks. Dual latch magnets 51 and 52 control spring loaded armatures 53 and 54 which cooperate with arms 35 and 37 of the bell cranks to latch the arms in an idle condition.

In the operation of the present invention, the input drive shaft 15 is constantly rotated in one direction by any suitable means, such as an electric motor 55. Shaft 15 drives the interposer cams 45, 46 and the escape cams 28, 29 at a constant speed. As previously stated, escape cams 28 and 29 are identical in profile but are out of phase with each other by 180°. The dwell of the followers occurs when they are urged to their extreme left or right position and the oscillatory motion of the two cam followers, as the escape cams rotate, is alternately toward each other and apart. In general, one of the latch magnets is activated by a switch 56 to unlatch its associated armature immediately preceding a dwell, thus releasing one interposer drive rod which is extended into a slot 19 in the face gear under interposer cam control. The drive rod then drives the detent wheel to the opposite dwell and is withdrawn by action of the interposer cam until it is latched by its armature. Just before the detent wheel reaches the opposite dwell, the other latch magnet is activated, its armature is unlatched and its interposer drive rod extended into a slot in the face gear. Then both drive rods are moved back to the starting point. By way of detailed example, at a dwell position of cams 28 and 29, when guide 24 of cam follower 22 is in its extreme right hand position and guide 25 of follower 23 is in its extreme left hand position, latch magnet 51 is activated, by moving switch 56 to the right, to withdraw spring loaded armature 53. Bell crank 32 may then be rotated by spring 39 to extend interposer drive rod 41 into a slot 19 in the face gear. Movement of the drive rod 41 is controlled by interposer cam 46 acting through interposer 47. As the input shaft 15 continues to rotate, cam follower 22 pivots, guide 24 carries drive rod 41 in an arcuate path from right to left and the detent wheel is indexed counterclockwise one increment. At the same time, guide 25 of follower 23 moves from left to right as cam follower 23 pivots. Before the next dwell is reached, however, interposer cam 46 starts retracting drive rod 41 through interposer 47 and bell crank 32. At the middle of this dwell, the interposer drive rod 41 will be fully retracted and latched by armature 53. At this point, detent roller 18 locks the detent wheel against rotation. As interposer drive rod 41 is retracted and latched, latch magnet 52 is activated during the same dwell by moving switch 56 to the left, to withdraw spring loaded armature 54 and unlatch bell crank 31. This allows drive rod 42 to be extended into the next adjacent slot in the face gear. Rotation of escape cam 29 then moves cam follower 23, so that guide 25 carries drive rod 42 in an arcuate path from right to left. The detent wheel is thus indexed another increment in the counterclockwise direction. During the subsequent dwell, interposer drive rod 42 is retracted and latched by armature 54. One cycle is then complete and a second cycle is ready to be initiated by again activating latch magnet 51. It is apparent from this description that in a single rotation of the input drive shaft, the detent wheel is moved two increments. This results from the use of dual cams and followers, the purpose of which is to reduce the operating time of each by half. In other words, for an output of 150 c.p.s. at the sprocket wheel, each drive bar, magnet, cam and follower operates at only 75 c.p.s., thus extending the life of and reducing the load on these parts.

To reverse the direction of drive of the present invention, it is only necessary to activate the reverse solenoid by closing switch 57. This serves to withdraw interposer 48 and extend interposer 47. As a result, interposer cam 45 will then drive bell crank 32 and interposer cam 46 will drive bell crank 31. Accordingly, the interposer drive rods 41 and 42 will be extended in reverse order, so that they are in engagement with the face gear during the left to right movement of the cam followers 22 and 23 to drive the sprocket wheel in the clockwise direction.

Since the interposer cams 45 and 46 are 180° out of phase, only one interposer drive rod is permitted to engage the face gear of the detent wheel at a time. However, the profiles of the interposer cams are such that as one drive rod is withdrawn from the face gear, the other drive rod is extended into contact therewith. Accordingly, the detent wheel is engaged by one interposer drive rod or the other at all times while the escapement mechanism is operating. The detent wheel assembly is thus positively locked during the dwells of the escape cams, so that the record tape is positively held in a fixed position. This is of particular value when the present invention is employed as a record tape feed device in a high speed punch. When so used, the punching operations are timed to occur during the dwells of the escape cams when the record tape is held motionless.

If desired, the present escapement mechanism can be operated with magnets 51 and 52 continuously unlatched. In addition, the present drive mechanism can be employed to drive cards or other record media by omitting the teeth from the drive sprocket and providing a pressure roller above the media.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An incremental drive mechanism comprising: a detent wheel assembly which includes an output shaft; an oscillatory motion generator mounted on the output shaft adjacent to and in line with the detent wheel assembly; a constantly driven input shaft in driving engagement with the motion generator; and a drive control assembly connected to the input shaft, the drive control assembly including a plurality of elements for effecting a driving connection between the motion generator and the detent wheel assembly, the identical elements being employed to drive the detent wheel assembly in either a clockwise or counterclockwise direction without reversing the direction of rotation of the input shaft.

2. An incremental drive mechanism comprising: a detent wheel assembly which includes a face gear; an oscillatory motion generator mounted adjacent to and on the axis of rotation of the face gear; a constantly driven input shaft drivingly connected to the motion generator; and a drive control assembly mounted adjacent the motion generator, the drive control assembly including at least one interposer rod and means for reciprocating the interposer rod to effect a driving connection between the motion generator and the face gear, the interposer rod and means being capable of rotating the face gear in either a clockwise or counterclockwise direction without reversing the direction of rotation of the input shaft.

3. An incremental drive mechanism as defined in claim 2, in which the means for reciprocating the interposer rod is connected to the input shaft.

4. An incremental drive mechanism comprising: a detent wheel assembly which includes a face gear; an oscillatory motion generator mounted adjacent to and on the axis of rotation of the face gear; a constantly driven input shaft drivingly connected to the motion generator; and a drive control assembly mounted adjacent the motion generator, the drive control assembly including an interposer rod, a pivotally mounted bell crank connected to the interposer rod for reciprocating the interposer rod to effect a driving connection between the motion generator and the face gear to rotate the face gear in either a clockwise or counterclockwise direction without reversing the direction of rotation of the input shaft, and means connected to the input shaft for controlling the pivotal motion of the bell crank.

5. An incremental drive mechanism as defined in claim 4, in which the means includes a pair of cam surfaces carried by the input shaft, cam follower means forming a driving connection between the bell crank and one of the cam surfaces, and means for moving the cam follower means to connect the bell crank and the other cam surface to reverse the direction of rotation of the face gear without reversing the direction of rotation of the input shaft.

6. An incremental drive mechanism comprising: a detent wheel assembly which includes a face gear; an oscillatory motion generator mounted adjacent to and on the axis of rotation of the face gear; a constantly driven input shaft drivingly connected to the motion generator; a pair of interposer rods carried by the motion generator; and means for reciprocating the interposer rods in sequence to effect a driving connection in one direction between the motion generator and the face gear, said interposer rods and means being capable of rotating the face gear in either a clockwise or counterclockwise direction without reversing the direction of rotation of the input shaft.

7. An incremental drive mechanism as defined in claim 6, in which the means includes a pair of pivotally mounted bell cranks connected to the interposer rods, a pair of cam surfaces carried by the input drive shaft, cam followers forming driving connections between the cam surfaces and the bell cranks, and means for reversing the driving connections between the cam surfaces and the bell cranks to reverse the direction of rotation of the face gear.

8. An incremental drive mechanism as defined in claim 6, in which the motion generator includes a pair of elements mounted for oscillatory movement towards and away from each other, each element carrying one of the interposer rods.

9. An incremental drive mechanism comprising: a detent wheel assembly; a pair of cam followers mounted for oscillatory motion about the axis of rotation of the detent wheel assembly; a pair of escape cams mounted on a continuously rotating shaft, each of said cams being in driving contact with one of said cam followers; a pair of interposer rods carried by the cam followers; and means for reciprocating the interposer rods in sequence into and out of contact with the detent wheel assembly to impart increments of the oscillatory motion of the cam followers to the detent wheel assembly.

10. An incremental drive mechanism as defined in claim 9, in which the cam followers are yoke shaped and are slotted to permit spring loading against the escape cams.

11. An incremental drive mechanism as defined in claim 9, in which the means includes a pair of pivotally mounted bell cranks connected to the interposer rods, a pair of cam surfaces carried by the input drive shaft, cam followers forming driving connections between the cam surfaces and the bell cranks, and means for reversing the driving connections between the cam surfaces and the bell cranks to reverse the direction of rotation of the face gear.

References Cited in the file of this patent

UNITED STATES PATENTS

| | | |
|---|---|---|
| 541,840 | Diehl | July 2, 1895 |
| 1,732,247 | Tornberg | Oct. 22, 1929 |
| 2,933,931 | Lisinski | Apr. 26, 1960 |

FOREIGN PATENTS

| | | |
|---|---|---|
| 1,000,123 | Germany | Jan. 3, 1957 |